May 23, 1967     H. J. WANDERER     3,321,562
METHOD AND APPARATUS FOR FORMING ENLARGED CONTAINER RIM
Original Filed May 8, 1964
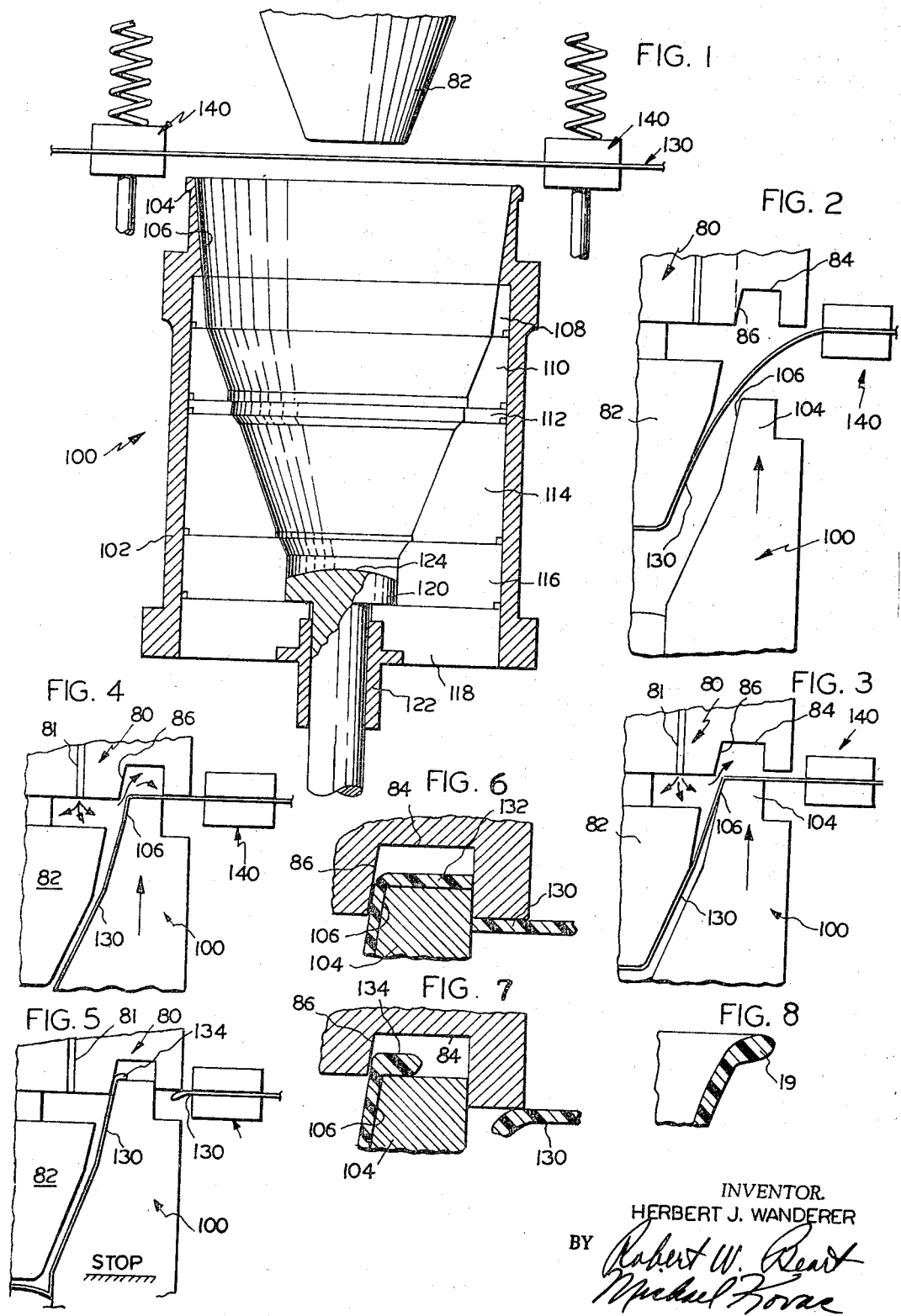
INVENTOR.
HERBERT J. WANDERER
BY
ATTORNEY

United States Patent Office 3,321,562
Patented May 23, 1967

3,321,562
METHOD AND APPARATUS FOR FORMING ENLARGED CONTAINER RIM
Herbert Jourdan Wanderer, Elmhurst, Ill., assignor to Illinois Tool Works Inc., Chicago, Ill., a corporation of Delaware
Original application May 8, 1964, Ser. No. 366,080, now Patent No. 3,232,512, dated Feb. 1, 1966. Divided and this application Sept. 15, 1965, Ser. No. 487,447
8 Claims. (Cl. 264—93)

This is a division of application Ser. No. 366,080, filed May 8, 1964, now Patent No. 3,232,512.

The present invention relates to a method and apparatus for forming articles from a web of thermoplastic material, and more particularly, to a method and apparatus which enables the forming of an enlarged peripheral bead or rim at the open mouth of a thermoplastic container.

It is now well known that containers can be mechanically and/or pressure formed from a heated web of thermoplastic material, and then severed from the web to form individual container articles. When severed from the web, a certain amount of flash is left along the cut edge which is not only unsightly, but can be harmful. An exposed cut edge can cause physical injury to a user either during drinking or handling of a container, and it thus has become customary to fold or roll the cut edge to an inaccessible position and provide a smooth surface container lip or rim which overcomes the above noted disadvantages.

In the usual case, the rim rolling or curling operation is secondary to the container forming operation, and this may not always be practical where container cost must be kept to a minimum. A particular example is the disposable insert cup disclosed and claimed in my aforementioned patent. There have been several attempts to roll or curl the container rim during the molding operation, but they have not been entirely satisfactory due to the extreme precision required in the tooling to effect an appropriately curled rim or lip.

Accordingly, it is an object of the present invention to provide a method and apparatus for forming, in a single operation, a thermoplastic container suitable for drinking or handling.

More particularly, it is an object of the present invention to form a thermoplastic container in a single operation without subsequent movement or forming at a second station.

Another object of the present invention is to provide a method and apparatus for forming containers with enlarged peripheral beads at a low cost without impeding the speed or effectiveness of the forming operation.

Other objects and advantages will become apparent from the following description when read in connection with the accompanying drawings wherein:

FIG. 1 is a partial semi-diagrammatic view of the apparatus used in forming a cup with an enlarged rim according to the teachings of the present invention;

FIGS. 2–5 are also partial semi-diagrammatic views similar to FIG. 1, and showing the next succeeding positions of the apparatus components during the cycling thereof;

FIG. 6 is an enlarged fragmentary sectional view of a portion of the apparatus showing the severance of a container from a web of thermoplastic material;

FIG. 7 is an enlarged fragmentary sectional view similar to FIG. 6, and showing the formation of the enlarged peripheral bead on the upper margin of the container; and FIG. 8 is an enlarged fragmentary sectional view of the enlarged peripheral bead formed on the container by the method and apparatus of the present invention.

Although the method and apparatus of the present invention is particularly suited to the manufacture of thin wall containers of the disposable insert cup variety as shown in my aforementioned patent, it is to be understood that other container shapes and configurations may be formed with an enlarged peripheral bead as desired.

It is now recognized that it is important to either roll or increase the thickness of a container rim formed from thermoplastic material not only for strengthening the container in the vicinity of its open mouth, but also for eliminating any burrs and other undesirable formations when the container is manufactured. However, rolling the rims on thermoplastic containers requires additional labor and machines, thus increasing the cost of containers which, for competitive necessity, must be made at a relatively low cost. This indicates the desirability of forming a completed cup in a single operation.

To accomplish this, the method and apparatus shown in FIGS. 1–5 is provided. The apparatus includes a die block 80 having a mandrel 82 which cooperates with the cavity of mold 100 to form a container of the type previously described. The die block 80 and mold 100 are designed to receive a web of suitable thermoplastic material 130, such as polystyrene, therebetween. This web is unwound from a suitable supply roll (not shown), and fed to the apparatus by suitable feed means (not shown) which accurately and intermittently supplies the web to the apparatus. Prior to being positioned between the die block and mold of the apparatus, the web is fed past a temperature controlling means (not shown) which assures that the web of material is at the correct temperature for the subsequent molding operations.

For a specific description of the feeding and temperature controlling means, reference is made to U.S. Patent Numbers 2,891,280 and 2,962,758 which have been assigned to the same assignee of the present invention. These patents also show the means for operating the various elements of the apparatus in the manner to be presently described.

The method and apparatus for forming the containers of the present invention is generally similar to that disclosed and described in the above mentioned patents. To facilitate an understanding of the method and apparatus of the present invention, a brief review of the apparatus and its operation as shown in the above mentioned patents, as related to the present invention, will now be described. The thermoplastic material 130, which has been heated, is fed to and supported between the die block 80 and mold 100. A clamping means 140 is associated with both the die block and female mold for clamping the thermoplastic sheet around the opposed mandrel and female mold. It has been found that by clamping the material in this vicinity, the container which is formed by the molding apparatus will have a uniform wall thickness which is not only important from the strength standpoint, but also for the appearance of the container. Relative movement of the die block and mold toward each other will force the clamping means 130 in engagement with the web. Mandrel 82 will engage the web on the continued movement of the die block and mold toward each other to mechanically predraw predetermined areas of the web. After a designated time period has elapsed, and prior to the complete interfitting movement of the mandrel and mold, fluid pressure is introduced to the ports 81 in the die block to expand the drawn predetermined areas of the web against the mold to complete the formation of the container. When the container is so formed, it will be severed from the web by complementary cutting means associated with the die block and mold. The lip or rim of the container will then be formed in a subsequent operation.

The method and apparatus of the present invention is designed to form an enlarged bead adjacent the open mouth of the container without subsequent operations, and for this purpose, an annular recess 84 is formed in the die block 80, and is provided with a tapered wall 86 defining the inner peripheral wall portion of the recess. Disposed opposite to this recess in the die block is the upstanding projection 104 formed at the outer end of the mold frame 102. This upstanding projection 104 has a complementary tapered surface 106 which is adapted to coact with the tapered wall 86 to clamp and hold the material during the molding operation as will presently appear.

The frame 102 of the mold encloses various container mold portions for forming the engaging surfaces, the stacking means, etc. of the disposable insert cup shown in my aforementioned patent. The undercut area of the frame directly beneath the upstanding projection 104 has resting thereagainst an upper body mold portion 108. Spaced downwardly from this upper body mold portion 108 is a side wall mold portion 110, a stacking ring mold portion 112, a second side wall mold portion 114, and a gripping surface mold portion 116. These various mold portions are suitably retained in place by the mold support 118 which is secured to the frame 102. A cup ejector 120 is journaled within the bearing 122 which is in turn secured to the mold support 118. The upper surface of this cup ejector 120 is illustrated as being convex in shape for forming a false bottom in the formed container. Although the mold 100 is preferably made into various portions as just described, it is obvious that it also can be made of integral construction.

The above mentioned patents indicate that it is desirable to seal the upper end of the partially formed container prior to the introduction of fluid pressure, and for this purpose, the apparatus disclosed in these patents was provided with container sealing means similar to the recess 84 and upstanding projection 104 of the present invention for sealing the area in which the fluid pressure was to be introduced. The recess and upstanding projection of the present invention will, of course, seal the area in which the fluid pressure is to be introduced; however, it has been found desirable to introduce fluid pressure prior to sealing the drawn predetermined areas of the material. This has been done primarily for the purpose of clamping the partially drawn material against the tapered wall surface 106 of the upstanding projection prior to the complementary interfitting movement of the latter with the recess 84. This sequence of events is shown in FIGS. 2–3, FIG. 2 illustrating the manner in which predetermined areas of the material 13 are mechanically predrawn by the mandrel 82 after being clamped by the clamping means 140, and FIG. 3 indicating the manner in which fluid pressure is introduced through the ports 81 in the die block prior to the interfitting movement of the upstanding projection 104 within the recess 84. By introducing fluid pressure prior to the interfitting movement of the recess 84 and upstanding projection 104, a pinch seal of the material between tapered surfaces 86 and 106 will be assured so as to provide a pneumatic seal as well as prevent slippage of the upper margin of the cup or container within the female mold. An inspection of FIGS. 4–5 will reveal this to be the case.

Additionally, it will be observed as best seen in FIGS. 5 and 6 that only a substantially vertically extending upper margin of the container will be clamped on opposite sides by the tapered surfaces 86, 106, and this will aid in the formation of the peripherally enlarged bead or rim portion. When the container has been completely formed, it will be severed by the complementary cutting surfaces associated with the recess and upstanding projection at a point laterally spaced from the clamped upper margin of the container. As will be apparent, these cutting surfaces are the ones which are located on the outer peripheral portions of the recess 84 and upstanding projection 104. Cutting surfaces independent of the die block and mold may be provided if desired.

Once the container has been severed from the web of thermoplastic material, the severed free end 132 of the container as shown in FIG. 6 will be stress relieved to permit the same to fold back and self-adhere to itself in the vicinity of the upper margin of the container. The severed free end 132 of the container remains heated since it is not subject to the fluid pressure which expands and thereafter cools the container body. This, together with the fact that the container is clamped by the pinch surfaces 86, 106 at a point laterally spaced from the cutting thereof will cause the severed free end to travel toward the clamped upper margin of the container to create the enlarged peripheral bead shown in FIGS. 5–7. Thus, the enlarged peripheral bead 134 may be formed by what is termed a "hot-cut snapback" operation. Subsequent withdrawal of the die block and mold from each other serves to release any additional material stresses built up in the material, and cause the enlarged peripheral bead or rim portion to assume the position of the thickened rim portion 19 shown in FIG. 8 of the drawings.

It will be apparent that variations in the angle of the pinch surfaces will permit a variation in the mold stopping point. The relative thickness of the lips with respect to the side wall thickness of the container is determined by the thickness of the initial web of heated thermoplastic material, and the length of the snapback. The snapback of the severed free end of the container whereby it folds back and self-adheres to itself in the vicinity of the upper margin of the container could be made to occur in a confined area for further controlling the final shape of the completed lip or rim portion. A protuberance extending from the bottom wall of the recess in the vicinity of the inner peripheral wall portion thereof would be one way of controlling the final shape of the lip or rim portion. The only limitation imposed would be that the severed free end of the container should be allowed to shift toward the upper margin of the container when its material stresses are relieved.

The operation of the apparatus described hereinabove is as follows: thermoplastic material 130 is intermittently fed past a heating station to the molding apparatus in timed relation with the movement of the die block 80 and female mold 100. Clamping means 140 are then actuated to clamp opposite sides of the material in a circumferential manner surrounding the die block and female mold. Relative shifting movement of the die block and female mold toward each other will cause the mandrel 82 to mechanically predraw predetermined areas of the sheet into the cavity of the mold. Just prior to the pinch seal at the upper margin of the container between tapered surfaces 86, 106, fluid pressure is introduced through the ports 81 in the die block to clamp the material against the upstanding projection. Further relative movement of the die block and mold causes the surfaces 86, 106 to coact, clamping the sheet and providing a pinch seal to enclose the area in which the fluid pressure is introduced on one side of the partially formed container. In this manner, the fluid pressure will expand the predrawn areas of the web into the various container mold portions 108–116 to create the disposable insert cup of the present invention. At approximately the same time that the predrawn areas of the web are expanded against the container mold portions, the complementary cutting surfaces associated with the die block and female mold will sever the container from the web of thermoplastic material at a point laterally spaced from the clamped upper margin of the container to relieve any material stresses in this vicinity. The heated severed free end 132 of the container then snaps back upon itself in the vicinity of the upper margin of the container to form the enlarged peripheral bead portion 134. Withdrawal of the die block and mold from each other will cause the enlarged bead or rim to assume the position shown by lip or rim 19 in FIG. 8. The container is then pushed out of the female mold by the ejector or knockout 120.

From the foregoing description, it will be apparent that the method and apparatus of the present invention will form a container of superior characteristics with an enlarged peripheral bead or rim portion.

Although a specific embodiment of the method and apparatus has been shown and described, it is will full awareness that many modifications thereof are possible. The invention, therefore, is not to be restricted except insofar as is necessitated by the prior art and by the spirit of the appended claims.

I claim:

1. The method of forming an enlarged peripheral bead on an article from heated plastic sheet stock having an elastic memory comprising forming an article having a substantially vertically extending side wall, clamping the side wall of the article at its upper margin, and severing the article from the sheet stock at a point laterally and outwardly spaced from the clamped upper margin of the article side wall while the article is still in a heated condition to stress relieve the severed free end and thereby cause a material build up in the vicinity of the clamped upper margin of the article to form the enlarged peripheral bead portion.

2. The method of forming a thickened portion on a hollow molded article comprising the steps of drawing predetermined areas from a horizontally supported sheet of heated thermoplastic material having an elastic memory, clamping opposite sides of a substantially vertically extending upper margin of the material so drawn, and severing the material at a point laterally and outwardly spaced from the clamped upper margin while the material is still heated whereby to relieve material stresses between the cut and clamped portions of the material and cause material to build up at the clamped upper margin of the article.

3. The method of forming a thickened portion on a hollow molded article comprising the steps of clamping heated thermoplastic sheet material having an elastic memory between mold and mandrel means, relatively moving said male and female mold toward each other to mechanically draw predetermined areas of the material to partially form the container, simultaneously clamping a substantially vertically extending upper margin of the drawn material and expanding the predetermined drawn areas to complete the formation of the article body portion, and severing the material at a point laterally and outwardly spaced from the clamped upper margin of the container while the material is still heated whereby to permit the severed free end to fold back and self-adhere to itself to form the thickened portion of the article.

4. The method of forming a thin walled container from heated thermoplastic material having an elastic memory with an integral lip portion having an increased thickness relative to the wall thickness of said container, comprising the steps of supporting the heated thermoplastic sheet in alignment with and between a cooperating mandrel and female mold, clamping opposite sides of the material in a circumferential manner outside the male and female mold periphery, relatively moving said mandrel and female mold toward each other for a portion of their interfitting movement to mechanically draw predetermined areas of the material, simultaneously clamping a substantially vertically extending upper margin of the drawn material and expanding the predetermined drawn areas to complete the formation of the container, and severing the material at a point laterally and outwardly spaced from the clamped upper margin of the container while the container is still heated whereby to permit the severed free end of the container to fold back and self-adhere to itself in the vicinity of the clamped upper margin of the container.

5. Apparatus for forming a thin walled container from heated thermoplastic material with an integral lip portion having an increased thickness relative to the wall thickness of said container, comprising a mold having a cavity, an upstanding annular projection surrounding an upper margin of the mold cavity and having an inner peripheral surface tapering upwardly therefrom, a die block having a mandrel disposed opposite to said mold cavity and being provided with an annular recess encircling the mandrel and aligned with said upstanding projection, an inner peripheral wall defining the innermost limits of said recess extending complementary to the tapered inner peripheral surface of said upstanding projection, means for clamping the heated thermoplastic material intermediate of and in a circumferential manner outside the mandrel and mold periphery, means for relatively shifting said mold and die block toward each other for a portion of their interfitting movement to draw predetermined areas of the sheet into the mold cavity, means for introducing a fluid pressure to one side of said thermoplastic material for clamping an upper margin of the container to said upstanding projection and for expanding the drawn areas of the material to complete the formation of the container, the continued relative movement of said mold and die block toward each other clamping opposite sides of the material at the container upper margin between the complementary wall and surface of said projection and recess, and means for severing the material at a point laterally and outwardly spaced from the clamped upper margin of the container whereby to relieve the material stresses in this vicinity and cause a material build up at the clamped upper margin of the container.

6. The apparatus as defined in claim 5 wherein a shoulder extends upwardly from the bottom wall of the annular recess in the vicinity of the complementary tapered wall to confine the shape of the thickened lip to a predetermined configuration.

7. The apparatus as set forth in claim 5 wherein said means for severing the material comprises complementary cutting surfaces associated with said mold and die block.

8. The apparatus as set forth in claim 5 wherein the means for severing the material comprises complementary interfitting outer peripheral surfaces of said upstanding annular projection and said annular recess.

References Cited by the Examiner

UNITED STATES PATENTS

| 3,172,159 | 3/1965 | Edwards. | |
| 3,175,027 | 3/1965 | Harrison | 264—230 |
| 3,190,530 | 6/1965 | Edwards | 229—1.58 |

ROBERT F. WHITE, *Primary Examiner.*

A. R. NOE, *Assistant Examiner.*